United States Patent

Mayer et al.

[19]

[11] Patent Number: 4,692,474

[45] Date of Patent: Sep. 8, 1987

[54] METHOD FOR PREPARING PLASTIC FOAMS

[75] Inventors: Hans Mayer; Rudolf Mühlhofer; Bernward Deubzer, all of Burghausen; Walter Mayerhofer, Marktl, all of Fed. Rep. of Germany

[73] Assignee: Wacker-Chemie GmbH, Munich, Fed. Rep. of Germany

[21] Appl. No.: 874,329

[22] Filed: Jun. 16, 1986

[30] Foreign Application Priority Data

Jul. 9, 1985 [DE] Fed. Rep. of Germany ....... 3524493

[51] Int. Cl.$^4$ .............................................. C08J 9/02
[52] U.S. Cl. ....................... 521/88; 521/77; 521/117; 521/154; 528/25; 528/26; 528/26.5; 528/29; 528/33; 528/34
[58] Field of Search ................... 528/26, 26.5, 29, 25, 528/33, 34; 521/88, 117, 154, 77

[56] References Cited

U.S. PATENT DOCUMENTS

| | | | |
|---|---|---|---|
| 3,036,019 | 5/1962 | Molotsky et al. | 521/154 |
| 3,923,705 | 12/1975 | Smith | 521/154 |
| 4,026,842 | 5/1977 | Lee et al. | 521/154 |
| 4,026,843 | 5/1977 | Kittle | 521/154 |
| 4,460,712 | 7/1984 | Blizzard et al. | 521/154 |
| 4,461,851 | 7/1984 | Hashimoto et al. | 521/154 |
| 4,476,188 | 10/1984 | Blizzard et al. | 521/154 |
| 4,490,488 | 12/1984 | Cush | 521/154 |
| 4,492,775 | 1/1985 | Koshii et al. | 521/154 |

*Primary Examiner*—Morton Foelak

[57] ABSTRACT

Plastic foams are prepared by reacting a compound containing Si-bonded hydrogen and at least one SiC-bonded radical having a basic nitrogen atom in the same molecule with a hydroxyl-containing compound.

7 Claims, No Drawings

METHOD FOR PREPARING PLASTIC FOAMS

The present invention relates to plastic foams and more particularly to a method for preparing organopolysiloxane foams.

BACKGROUND OF THE INVENTION

Plastic foams, and in particular organopolysiloxane foams, have been described in British Patent No. 867,619 to Midland Silicones, in which Si-bonded hydrogen containing silicon compounds have been reacted with compounds containing one or more hydroxyl groups.

It is, therefore, an object of the present invention to provide a method for preparing organopolysiloxane foams. Another object of the present invention is to provide a method for preparing organopolysiloxane foams having stable dimensions. A further object of the present invention is to provide a method for preparing stable organopolysiloxane foams within a short period of time.

SUMMARY OF THE INVENTION

The foregoing objects and others which will become apparent from the following description are accomplished in accordance with this invention, generally speaking, by providing a method for preparing plastic foams which comprises reacting an organosilicon compound having Si-bonded hydrogen and at least one SiC-bonded radical having at least one basic nitrogen atom in the same molecule with a compound containing at least one hydroxyl group.

DESCRIPTION OF THE INVENTION

The organosilicon compounds used in the method of this invention to prepare plastic foams may be cyclic, linear or branched organopolysiloxanes. The organopolysiloxanes used in the method of this invention which contain Si-bonded hydrogen preferably have units of the formula

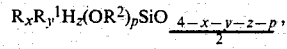

where R represents the same or different monovalent SiC-bonded organic radicals which are free of nitrogen; $R^1$ represents the same or different monovalent SiC-bonded radicals having a basic nitrogen atom; $R^2$ represents the same or different alkyl radicals having from 1 to 4 carbon atoms per radical; x is 0, 1, 2 or 3, preferably an average of from 0 to 2 and more preferably an average of from 0 to 1.8; y is 0 or 1, preferably an average of from 0.1 to 0.6, and more preferably an average of from 0.15 to 0.3; z is 0 or 1, preferably an average of from 0.2 to 1, and more preferably an average of from 0.5 to 1; p is 0, 1, 2 or 3, preferably an average of from 0 to 0.8, and more preferably an average of from 0.01 to 0.6; and the sum of the respective average values of x, y, z and p does not exceed 3.4.

The SiC-bonded organic radicals represented by R above, which are free of basic nitrogen atoms are hydrocarbon radicals which have from 1 to 20 carbon atoms per radical. Specific examples of the hydrocarbon radicals are alkyl radicals, such as the methyl, ethyl, n-propyl and the ispropyl radicals, as well as the octadecyl radicals; aliphatic hydrocarbon radicals having at least one double bond, such as the vinyl and the allyl radicals, as well as butadienyl radicals; cycloaliphatic hydrocarbon radicals, such as the cyclohexyl radical and the methylcyclohexyl radicals; aromatic hydrocarbon radicals, such as the phenyl radical and naphthyl radicals; alkaryl radicals, such as the tolyl radicals and aralkyl radicals, such as the benzyl radical. These hydrocarbon radicals may also contain substituents which are inert to the Si-bonded hydrogen, basic nitrogen and hydroxyl groups at temperatures below 50° C. Examples of such substituted hydrocarbon radicals are fluorinated hydrocarbon radicals, such as the 3,3,3-trifluoropropyl radical; monovalent aliphatic radicals consisting of carbon, hydrogen, ether- oxygen and fluorine atoms, such as the 1,1,2,2,3,3-hexafluoropropyloxypropyl radical and the 1,1,2,2-tetrafluoroethoxypropyl radical, and monovalent hydrocarbon radicals containing ether oxygen atoms as the only substituent, for example, the p-methoxyphenyl radical.

Because they are readily available, methyl radicals are the preferred SiC-bonded organic radicals which are free of basic nitrogen, that are present in the organopolysiloxanes used in this invention. Furthermore, it is preferred that a hydrocarbon radical, preferably a methyl radical, also be bonded to each silicon atom that is bonded directly to a hydrogen atom.

Preferred SiC-bonded radicals having basic nitrogen atoms which are represented in the above formula as $R^1$ are those of the formula

wherein $R^3$ represents hydrogen or the same or different alkyl or amino or iminoalkyl radicals and $R^4$ represents a divalent hydrocarbon radical.

The examples cited above for alkyl radicals representing R are equally applicable to the alkyl radicals represented by $R^3$. It is, however, preferred that at least one hydrogen atom be bonded to each nitrogen atom in the radicals of the formula

It is preferred that the divalent hydrocarbon radicals represented by $R^4$ have no more than about 20 carbon atoms per radical. Examples of such hydrocarbon radicals are the methylene and the ethylene radical, as well as the propylene, butylene, cyclohexylene, octadecylene, phenylene and butenylene radicals. Because of its availability, it is preferred that the $R^4$ radical be a n-propylene radical. The preferred SiC-bonded radical having a basic nitrogen which is represented by $R^1$ is the radical having the formula

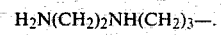

Additional examples of SiC-bonded radicals containing basic nitrogen, which are represented by $R^1$ radicals are those having the formulas

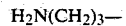

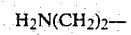

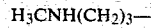

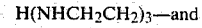

n—C$_4$H$_9$NH(CH$_2$)$_2$NH(CH$_2$)$_3$—.

Examples of R$^2$ radicals are especially the methyl, the ethyl and the isopropyl radical.

The compounds employed in the method of this invention which contain Si-bonded hydrogen and have at least one SiC-bonded radical with basic nitrogen, may be obtained, for example, by equilibrating or condensing gamma-aminoethylaminopropyltrimethoxysilane or gamma-aminoethylaminopropylmethyldimethoxysilane or mixtures of such silanes with organopolysiloxanes which are free of basic nitrogen, but which contain Si-bonded hydrogen. The organopolysiloxanes used are preferably methylhydrogenpolysiloxanes which are end-blocked by trimethylsiloxy groups or copolymers comprising trimethylsiloxy groups, dimethylsiloxane and methylhydrogensiloxane units.

The compounds which contain hydroxyl groups and whose reaction with Si-bonded hydrogen causes the formation of the foam and the crosslinking of the organopolysiloxane which contains SiC-bonded radicals having basic nitrogen, are preferably water, alcohols containing at least two hydroxyl groups per molecule, such as ethylene glycol, glycerin or triethanolamine, as well as organosilanols and organopolysiloxanols, such as dimethylpolysiloxanols.

It is preferred that the compounds containing hydroxyl groups, whose reaction with Si-bonded hydrogen results in the formation of the foam and the crosslinking of the organopolysiloxane containing SiC-bonded radicals having basic nitrogen, be employed in an amount of from 1 to 20 gram equivalents of hydroxyl groups per gram atom of Si-bonded hydrogen.

The method of this invention is preferably carried out at temperatures of from about −20° C. to about 50° C. and at atmospheric pressure, i.e., at 1020 hPa (absolute), or at approximately 1020 hPa (absolute).

In the method of this invention, the cleaving of the Si-bonded hydrogen can be slowed down by the addition of an anhydrous acid such as glacial acetic acid, before or simultaneously with the addition of the compound containing hydroxyl groups whose reaction with Si-bonded hydrogen results in the formation of foam and the crosslinking of the organopolysiloxanes which contain at least one SiC-bonded radical with basic nitrogen.

The foams produced in accordance with this invention may, for example, be used as hydrophobe building materials and as thermal insulating materials in buildings and in land, water and airborne vehicles.

In the formation of thermal insulating materials, the same opacifiers may be used in the method of this invention which have been or could have been used heretofore in manufacturing thermal insulating materials. Examples of such opacifiers are ilmenite, titanium dioxide including rutile, chromium oxide, manganese oxide, zirconium, iron oxide, lead monoxide and carbides of silicon, boron, tantalum or tungsten metallic aluminum, tungsten or silicon or mixtures comprising at least two such opacifiers. These opacifiers may be present in an amount up to about 60 percent by weight based on the total weight of the plastic foam.

In addition to silicon compounds containing Si-bonded hydrogen and at least one SiC-bonded radical having a basic nitrogen in the same molecule, it is possible to use other silicon compounds in the method of this invention.

EXAMPLE 1

(a) A mixture consisting of 400 g of a trimethylsiloxy end-blocked methylhydrogenpolysiloxane which has a viscosity of about 20 mm$^2$.s$^{-1}$ at 25 ° C. and 165 g of gamma-aminoethylaminopropyltrimethoxysilane is heated to 140° C. for 6 hours under nitrogen. The resultant organopolysiloxane is a clear liquid which has a viscosity of about 7.5 mm$^2$.s$^{-1}$ at 25° C. and is stable in the absence of air. It has an amine value (number of milliliters of 1NHCl required to neutralize one gram of substance) of 2.63, an amine nitrogen content of 3.7 percent and contains 1.1 percent by weight of Si-bonded hydrogen.

(b) About 10 g of water are added to 28.25 g of the organopolysiloxane whose preparation is described in (a) above. A substantial quantity of gas develops within 1 to 2 seconds, resulting in the formation of a stable foam. About 15 seconds later the reaction is terminated and the crosslinking of the foamed organopolysiloxane is complete.

EXAMPLE 2

About 2.5 g of glacial acetic acid and then 7 g of water are added to 20 g of the organopolysiloxane whose preparation is described in Example 1(a) above. The gas develops more slowly than in Example 1.

EXAMPLE 3

The method described in Example 2 is repeated, except that 5 g of glacial acetic acid is added instead of 2.5 g. The gas develops still more slowly than in Example 1.

Comparison Test

About 8.25 g of gamma-aminoethylaminopropyltrimethoxysilane and then 7 g of water are added to 20 g of trimethylsiloxy end-blocked methylhydrogenpolysiloxane having a viscosity of 20 mm$^2$.s$^{-1}$ at 25° C. The foam forms slower than in Example 1 and collapses almost completely before the organopolysiloxane is crosslinked.

EXAMPLE 4

(a) To a 1-liter, 3-necked flask equipped with a stirrer, a dropping funnel and a reflux condenser and containing a mixture consisting of 0.2 g of potassium hydroxide in 4 g of methanol and 500 g of a polyethylsilicate having an average molecular weight of about 450 g/mol and a viscosity of 4 mm$^2$.s$^{-1}$ at 25° C., is added 150 g of gamma-aminoethylaminopropyltrimethoxysilane with stirring. The resultant composition is heated for 6 hours to 100° C. and after the mixture has cooled to 30° C., it is mixed with 2.5 ml of aqueous 10 percent by weight of hydrochloric acid. The composition is then heated to 130° C. and 1.06 g of the contents of the flask are distilled off. The potassium chloride is filtered off.

(b) About 15 g of glycerin is added to 100 g of a mixture containing 50 parts by weight of an organopolysiloxane which is free of Si-bonded hydrogen and whose preparation is described in (a) above, 50 parts by weight of the organopolysiloxane whose preparation is described in Example 1(a) above, 50 parts by weight of the methylhydrogenpolysiloxane described in Example 1(a) above, 50 parts by weight of gamma-aminoethylaminopropyltrimethoxysilane and 60 parts by weight of powdered ilmenite. After one or two seconds, the vigorous production of gas occurs and results in the formation of foam having stable dimensions. About 15 seconds later, the reaction is complete and the organopolysiloxanes are crosslinked. The resultant product is a thermal insulating material having outstanding properties.

EXAMPLE 5

The method described in Example 4(b) is repeated, except that 60 parts by weight of powdered titanium dioxide is substituted for the 60 parts by weight of ilmenite. An outstanding thermal insulating material is obtained.

What is claimed is:

1. A method for preparing plastic foams, which comprises reacting a compound containing Si-bonded hydrogen and at least one SiC-bonded radical having at least one basic nitrogen atom in the same molecule with a compound containing at least one hydroxyl group.

2. The method of claim 1, wherein the compound containing Si-bonded hydrogen and at least one SiC-bonded radical having a basic nitrogen atom is obtained from the equilibration of a trimethylsiloxy end-blocked methylhydrogenpolysiloxane with gamma-aminoethylaminopropyltrimethoxysilane.

3. The method of claim 1, wherein the compound containing Si-bonded hydrogen and at least one SiC-bonded radical having at least one basic nitrogen atom in the same molecule is an organopolysiloxane of the formula $$R_x R_y^1 H_z (OR^2)_p SiO_{\frac{4-x-y-z-p}{2}}$$

where R is a monovalent SiC-bonded organic radical which is free of nitrogen, $R^1$ is a monovalent SiC-bonded organic radical having a basic nitrogen atom, $R^2$ is an alkyl radical having from 1 to 4 carbon atoms, x is an average of from 0 to 3, y is an average value of from 0.1 to 1, z is an average of from 0.1 to 1, p is an average of from 0 to 3 and the sum of the average values of x, y, z and p does not exceed 3.4.

4. The method of claim 1, wherein the SiC-bonded radical having a basic nitrogen is represented by the formula $$R_2^3 N R^4-$$

where $R^3$ is selected from the group consisting of hydrogen, amino, iminoalkyl and alkyl radicals and $R^4$ is a divalent hydrocarbon radical.

5. The method of claim 4, wherein the SiC-bonded radical having a basic nitrogen is represented by the formula $$H_2N(CH_2)_2NH(CH_2)_3-$$

6. The method of claim 1, wherein the compound containing at least one hydroxyl group is water.

7. The method of claim 1, wherein the compound containing Si-bonded hydrogen and at least one SiC-bonded radical having at least one basic nitrogen atom in the same molecule and a compound containing at least one hydroxyl group is reacted in the presence of an anhydrous acid.

* * * * *